United States Patent [19]

Ikumi et al.

[11] Patent Number: 5,163,127
[45] Date of Patent: Nov. 10, 1992

[54] THREE DIMENSIONAL GRAPHIC PROCESSING APPARATUS

[75] Inventors: Nobuyuki Ikumi, Tokyo; Mitsuo Saito, Yokosuka; Takeshi Aikawa, Chofu; Masahide Ohhashi, Yokohama, all of Japan

[73] Assignee: Kabushiki Kaisha Toshiba, Kawasaki, Japan

[21] Appl. No.: 687,772

[22] Filed: Apr. 19, 1991

Related U.S. Application Data

[63] Continuation of Ser. No. 309,523, Feb. 13, 1989, abandoned.

[30] Foreign Application Priority Data

Feb. 16, 1988 [JP] Japan .................................. 63-33437

[51] Int. Cl.$^5$ .............................................. G06F 3/153
[52] U.S. Cl. .................................... 395/126; 395/120
[58] Field of Search ...................... 364/518, 521, 522; 340/721, 723, 728, 729, 744, 746; 382/54, 49; 358/163, 166, 135, 903; 395/120, 119, 121, 122, 123, 126

[56] References Cited

U.S. PATENT DOCUMENTS

| | | | |
|---|---|---|---|
| 4,354,243 | 10/1982 | Ryan et al. | 358/163 X |
| 4,486,785 | 12/1984 | Lasher et al. | 340/728 X |
| 4,586,038 | 4/1986 | Sims et al. | 340/729 |
| 4,747,157 | 5/1988 | Kurakake et al. | 382/54 X |
| 4,791,582 | 12/1988 | Ueda et al. | 364/522 |
| 4,805,116 | 2/1989 | Liang et al. | 364/521 |
| 4,827,445 | 5/1989 | Fuchs | 364/900 |
| 4,862,391 | 8/1989 | Ohhashi | 364/522 |
| 5,005,117 | 4/1991 | Ikumi | 364/200 |

OTHER PUBLICATIONS

D. Fussell et al., A VLSI-Oriented Architecture for Real-Time Raster Display of Shaded Polygons, May 17, 1982, Graphics Interface '82, pp. 376-377.

*Primary Examiner*—Heather R. Herndon
*Attorney, Agent, or Firm*—Finnegan, Henderson Farabow, Garrett and Dunner

[57] ABSTRACT

A three-dimensional graphic processing apparatus includes n arithmetic ICs (Integrated Circuits) for performing linear interpolation calculations for each scan line of a triangle polygon to obtain intensity values and depth coordinate values of pixels, and two types of n memories for storing the calculation results. The n arithmetic ICs parallelly execute linear interpolation calculations of n different pixels successive on a single scan line of a single triangle polygon in one processing cycle. Each arithmetic IC calculates for each of every n pixels in one processing cycle, and a corresponding one of the memories stores the calculation result.

7 Claims, 7 Drawing Sheets

| DIFFERENCE OF X COORDINATE | CORRECTION VALUE OF INTENSITY |
|---|---|
| 0 | 0 |
| 1 | ΔI |
| 2 | 2ΔI |
| 3 | 3ΔI |

FIG. 5

| DIFFERENCE OF X COORDINATE | CORRECTION VALUE OF Z COORDINATE |
|---|---|
| 0 | 0 |
| 1 | ΔZ |
| 2 | 2ΔZ |
| 3 | 3ΔZ |

FIG. 6

| | | TWO LOWER BITS OF X COORDINATE | | | |
|---|---|---|---|---|---|
| | IC No. | 0 | 1 | 2 | 3 |
| ΔI OR ΔZ | 0 | 0 | -Δ | -2Δ | -3Δ |
| | 1 | Δ | 0 | -Δ | -2Δ |
| | 2 | 2Δ | Δ | 0 | -Δ |
| | 3 | 3Δ | 2Δ | Δ | 0 |

FIG. 7

| | TWO LOWER BITS OF X COORDINATE | | | |
|---|---|---|---|---|
| IC No. | 0 | 1 | 2 | 3 |
| 0 | 1 | 0 | 0 | 0 |
| 1 | 1 | 1 | 0 | 0 |
| 2 | 1 | 1 | 1 | 0 |
| 3 | 1 | 1 | 1 | 1 |

FIG. 8

| | TWO LOWER BITS OF X COORDINATE | | | |
|---|---|---|---|---|
| IC No. | 0 | 1 | 2 | 3 |
| 0 | 1 | 1 | 1 | 1 |
| 1 | 0 | 1 | 1 | 1 |
| 2 | 0 | 0 | 1 | 1 |
| 3 | 0 | 0 | 0 | 1 |

| | ONE LOWER BIT AT X COORDINATE | |
|---|---|---|
| IC No. | 0 | 1 |
| ΔI OR ΔZ  0 | 0 | -Δ |
| 1 | Δ | 0 |

FIG. 14

THREE DIMENSIONAL GRAPHIC PROCESSING APPARATUS

This application is a continuation of application Ser. No. 07/309,523, filed Feb. 13, 1989, now abandoned.

BACKGROUND OF THE INVENTION

1. Field of the Invention

The present invention relates to a three-dimensional graphic processing apparatus for performing shading of a graphic pattern constituted by a plurality of polygons.

2. Description of the Related Art

In the field of three-dimensional graphic processing, Gouraud shading is well known as an algorithm for performing three-dimensional display by . The three-dimensional shading display obtained by the Gouraud shading will be described below. First, information about a polygon is given. The contents of the information are three-dimensional coordinate values and a intensity value of each vertex of the polygon. For example, if the polygon is a triangle as shown in FIG. 1, information (x,y,z,I) containing three-dimensional coordinate values and a intensity value about a vertex A is (x1,y1,z1,I1), that about a vertex B is (x2,y2,z2,I2), and that about a vertex C is (x3,y3,z3,I3).

Figure 1:
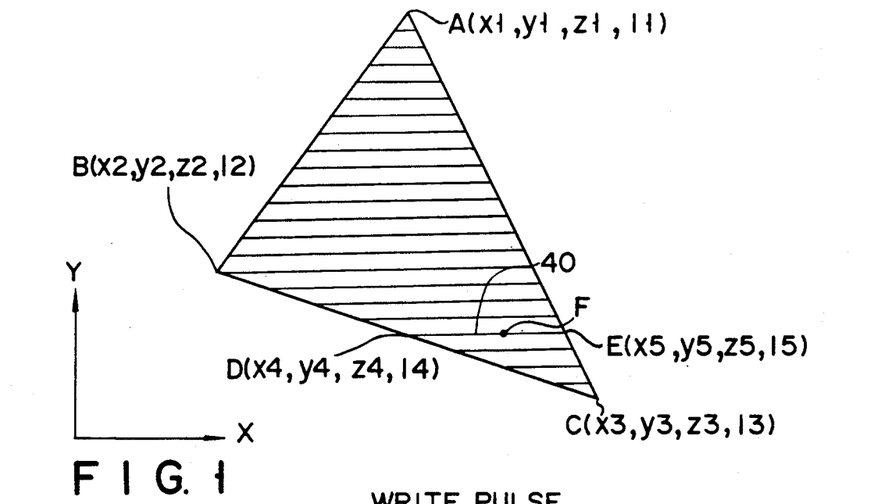
FIG. 1 is a view for explaining conventional painting of a polygon.

Referring to FIG. 1, assuming that reference numeral 40 denotes a scan line parallel to the X coordinate axis, in order to perform shading, intensity values, X and Y coordinate values, and Z coordinate values representing the depths must be calculated for pixels along the scan line 40. An intensity value I and the Z coordinate value can be calculated by interpolation calculations. For example, an intensity value I4 of a pixel D at a three-dimensional coordinate point (x4,y4,z4) as an intersection point of the line 40 and a side BC of the triangle polygon can be obtained by an interpolation calculation of vertexes B and C, and a intensity value I5 of a pixel E at a three-dimensional coordinate point (x5,y5,z5) as an intersection point of the line 40 and a side AC can be obtained by an interpolation calculation of vertexes A and C. That is, the intensity values 14 and 15 are given by:

$$I4 = I2\left(\frac{y4 - y3}{y2 - y3}\right) + I3\left(\frac{y2 - y4}{y2 - y3}\right) \quad 1$$

$$I5 = I1\left(\frac{y5 - y3}{y1 - y3}\right) + I3\left(\frac{y1 - y5}{y1 - y3}\right) \quad 2$$

An intensity value at an arbitrary pixel F on the line 40 can be obtained by an interpolation calculation of the intensity values I4 and I5.

Also, Z coordinate values z4 and z5 representing the depths of the pixels D and E and a Z coordinate value at the arbitrary pixel F on the line 40 can be obtained by similar interpolation calculations. That is, the Z coordinate values z4 and z5 are given by:

$$z4 = z2\left(\frac{y4 - y3}{y2 - y3}\right) + z3\left(\frac{y2 - y4}{y2 - y3}\right) \quad 3$$

$$z5 = z1\left(\frac{y5 - y3}{y1 - y3}\right) + z3\left(\frac{y1 - y5}{y1 - y3}\right) \quad 4$$

In this case, at pixels on one scan line parallel to the X coordinate axis, inclinations of Z coordinate values and those of intensity values with respect to X coordinate values are constant, respectively.

In a conventional apparatus for performing the three-dimensional shading display, Z coordinate values and intensity values of pixels on each scan line are sequentially calculated by a single arithmetic IC for each pixel. Calculation results are than written in a display memory to perform painting of a graphic pattern.

The access speed of memory, however, is lower than the calculation speed of the arithmetic IC, and the throughput of the entire apparatus is therefore determined by the access speed. Since the number of pixels constituting a three-dimensional graphic pattern is very large, shading requires a very long time in the conventional apparatus because of the low access speed.

SUMMARY OF THE INVENTION

The present invention has been made in consideration of the above situation and has as its object to provide a three-dimensional graphic processing apparatus capable of executing shading of a three-dimensional graphic pattern at high speed.

According to the present invention, there is provided a three-dimensional graphic processing apparatus comprising: n (n is an integer of two or more) arithmetic circuits (10A-10D) for calculating intensity values and depth coordinate values of different pixels on a single scan line in a triangle polygon constituting a three-dimensional graphic pattern; and two types of n memories (11A-11D, 12A-12D) for storing the intensity values and the depth coordinate values, respectively, of the pixels calculated by the n arithmetic circuits.

DETAILED DESCRIPTION OF THE PREFERRED EMBODIMENTS

Embodiments of the present invention will be described below with reference to the accompanying drawings.

As described above, at pixels on a scan line parallel to the X coordinate axis, inclinations of Z coordinate values and those of intensity values with respect to X coordinate values are constant, respectively. Therefore, Z coordinate values and intensity values of pixels on a single scan line can be calculated by calculating an inclination ΔZ of the Z coordinate values and an inclination ΔI of the intensity values and then sequentially adding these values.

Figure 2:
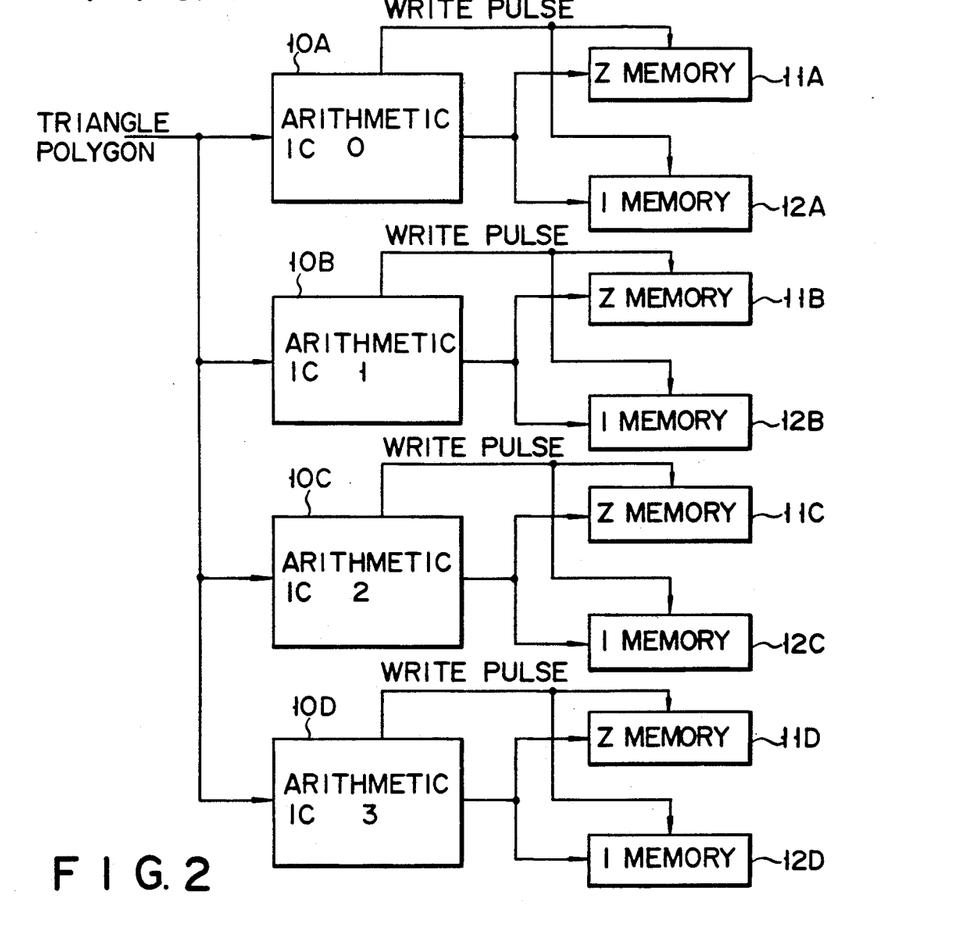
FIG. 2 is a block diagram showing an arrangement of a three-dimensional graphic processing apparatus according to an embodiment of the present invention.

If the polygon is a triangle, a pattern obtained by connecting vertexes of the triangle always becomes a plane. Therefore, in the case of a triangle polygon, inclinations ΔZ of Z coordinate values and inclinations ΔI of intensity values on all scan lines are constant, respectively. An apparatus of the present invention is based on this principle. In FIG. 2, reference numerals 10A, 10B, 10C and 10D denote arithmetic ICs for calculating an inclination ΔZ of Z coordinates and an inclination ΔI of intensity values on the polygon plane, for calculating a Z coordinate value and a intensity value I of a point from which painting is started on each scan line parallel to the X coordinate axis and which is present on one of three sides defining the triangle polygon, and for sequentially calculating Z coordinate values and intensity values I of different points on a single scan line, thereby performing shading and hidden surface removal. The arithmetic ICs 10A, 10B, 10C and 10D are assigned with numbers of 0, 1, 2 and 3, respectively. The Z coordinate values and the intensity values I calculated and subjected to hidden surface removal by the ICs 10A, 10B, 10C and 10D are stored in four Z memories 11A, 11B, 11C and 11D, and four I memories 12A, 12B, 12C and 12D, respectively. Each of the ICs 10A, 10B, 10C and 10D outputs a write pulse for storing a calculation result to a corresponding one of each of the Z memories 11 and the I memories 12. Note that in the above hidden surface removal, a smallest Z coordinate value of a polygon is selected. A polygon subjected to the hidden surface removal is present closest on a display screen.

Figure 3:
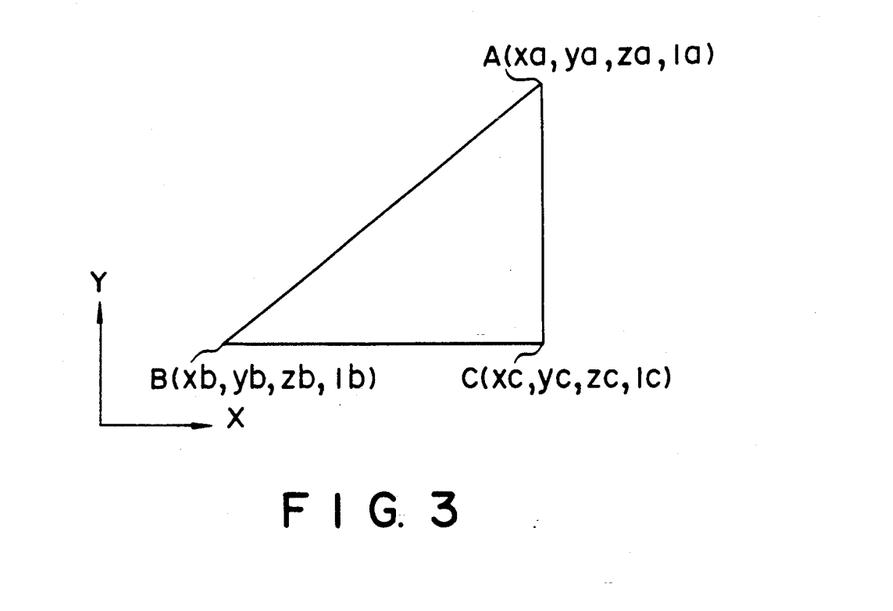
Figure 4:
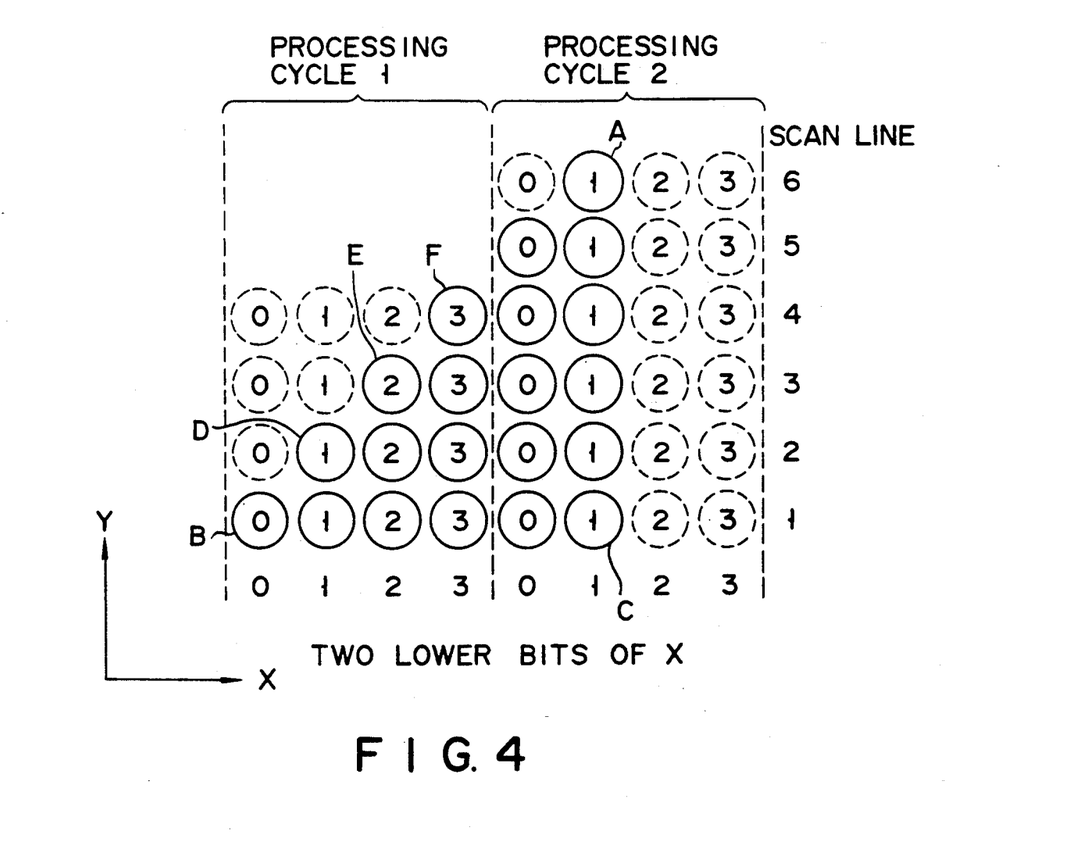

In the apparatus having the above arrangement, a case wherein a triangle polygon having vertexes A (xa,ya,za,Ia), B (xb,yb,zb,Ib) and C (xc,yc,zc,Ic) as shown in FIG. 3 is to be painted by the Gouraud shading to perform shading will be described below. Assume that six scan lines are horizontally (in the X-axis direction) set in the triangle polygon to be painted as shown in FIG. 4. On each scan line, pixels inside the polygon are indicated by solid circles, and those outside the polygon are indicated by broken circles.

Each pixel on each scan line is assigned with X- and Y-coordinate addresses. Z coordinate values and intensity values I of pixels in which two lower bits at the X-coordinate addresses represent numbers 0, 1, 2 and 3 are calculated by the arithmetic ICs 10A, 10B, 10C and 10D assigned with the numbers 0, 1, 2 and 3, respectively. The numbers 0, 1, 2 and 3 assigned to the respective pixels are written in the circles representing the pixels in FIG. 4 to be calculated by the ICs 10A, 10B, 10C and 10D.

In the case of this triangle polygon, a processing cycle for executing calculations by the ICs 10A, 10B, 10C and 10D is performed twice or once, and a processing cycle for painting is performed twice or once for each scan line starting from the first scan line. More specifically, in a processing cycle 1, Z coordinate values and intensity values of four successive pixels on a single scan line are calculated in parallel by the four arithmetic ICs 10A, 10B, 10C and 10D.

Figure 5:
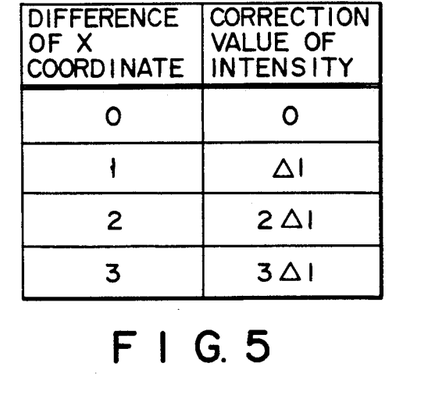

For the calculation, each arithmetic IC checks how far its calculation point is offset from a start point of linear interpolation on the X coordinate axis. This check is performed by comparing the two lower bits of the address of the X coordinate of the start point of linear interpolation with a number assigned to the corresponding arithmetic IC 10A-D. Each of the ICs 10A, 10B, 10C and 10D adds an intensity value corresponding to the difference of the X coordinate lower two bits and the assumed number to the calculated intensity value I of the painting start point (e.g., each pixel on a side AB of the triangle) on the scan line. Examples of intensity correction values are shown in Figures.

Figure 6:
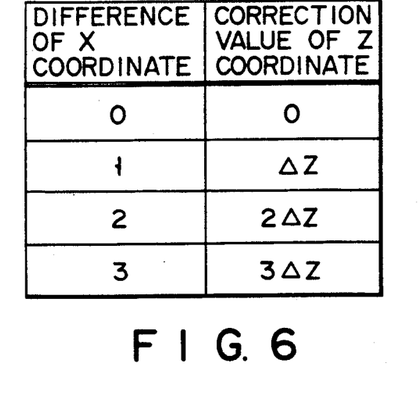

Each of the ICs 10A, 10B, 10C, and 10D also adds a Z coordinate correction value corresponding to a difference of the X coordinate have two bits and the assigned number to a Z coordinate value of the start Z coordinate correction values are shown in FIG. 6.

Figure 7:
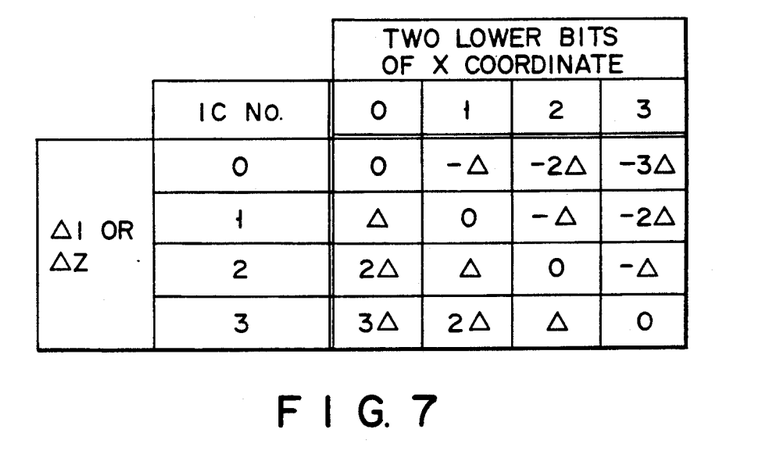

In making these calculations the arithmetic ICs first check to which IC the painting start point on the scan line corresponds. On the basis of this check, values shown in FIG. 7 are added as final correction values to the intensity values and Z coordinate values. In the next processing cycle 2, Z coordinate values and intensity values I of four successive pixels are calculated in parallel by the ICs 10A, 10B, 10C and 10D. At this time, each IC 10A–D adds 4ΔI and 4ΔZ to the intensity value and the Z coordinate value of the pixel calculated in corresponding processing cycle 1. Such calculations are performed for each scan line, and calculation results are sequentially supplied to a corresponding one of each of the Z memories 11A-D and the I memories 12A-D shown in FIG. 2.

To summarize, the first scan line is painted as follows. First, each arithmetic IC 10A-D checks how far its calculation point is offset from a start point (vertex B) of linear interpolation on the X coordinate axis. In this case, the calculation point of the IC 10A is the start point of the linear interpolation. The number represented by two lower bits at an address of an X coordinate and the number assigned to the IC 10A are both 0s. Thus, a difference between both the points on the X coordinate axis is 0. Similarly, differences between calculation points of the ICs 10B, 10C and 10D and the start point of the linear interpolation on the X coordinate axis are 1, 2 and 3, respectively.

In addition, each IC 10 determines that a value of two lower bits at an address of an X coordinate of the painting start point is 0 on the first scan line and coincides with the number 0 assigned to the IC 10A. In this case, the ICs 10A, 10B, 10C and 10D add correction values 0, Δ, 2Δ, 3Δ, respectively, to a intensity and X coordinate values at the painting start point for pixels in a column where the value of the two lower bits of the X coordinate is 0, as shown in FIG. 7. Note that the IC Nos. in FIG. 7 correspond to the numbers assigned to the ICs 10A, 10B, 10C and 10D. In the next processing cycle 2, the arithmetic ICs 10A, 10B, 10C and 10D add, in parallel, 4ΔI and 4ΔZ to the intensity values and the Z coordinate values of the respective points calculated in the preceding processing cycle 1. In this manner, intensity values I and Z coordinate values of four successive pixels are simultaneously calculated.

On the second scan line, each arithmetic IC 10 checks how far its calculation point is offset from a start point (D in FIG. 4) of linear interpolation on the X coordinate axis. In this case, a difference between a calculation point of the IC 10B, assigned with the number 1, for calculating the linear interpolation start point D and the start point D is 0. For this reason, the ICs 10A, 10B, 10C and 10D add correction values −Δ, 0, Δ and 2Δ, respectively, to the intensity values and Z coordinate values at the starting point for the pixels in a column where the value of the two lower bits of the X coordinate is 1, as shown in FIG. 7. In the next processing cycle 2, the ICs 10A, 10B, 10C and 10D add, in parallel $4\Delta I$ and $4\Delta Z$ to the intensity values and the Z coordinate values of the pixels calculated in the preceding processing cycle 1, thereby calculating intensity values I and Z coordinate values of four successive pixels.

On the third scan line, each arithmetic IC 10 checks how far its calculation point is offset from a start point (E in FIG. 4) of linear interpolation on the X coordinate axis. In this case, a difference between a calculation point of the IC 10C, assigned with the number 2, for calculating the linear interpolation start point E and the start point E is 0. For this reason, the ICs 10A, 10B, 10C and 10D add correction values $-2\Delta$, $-\alpha$, 0 and $\Delta$ in a column where the value of the two lower bits of the X coordinate is 2 in FIG. 7 to an intensity value and a Z coordinate value at the painting start point E, respectively. In the next processing cycle 2, the ICs 10A, 10B, 10C and 10D parallelly add $4\Delta I$ and $4\Delta Z$ to the intensity values and the Z coordinate values of the pixels calculated in the processing cycle 1, thereby calculating intensity values I and Z coordinate values of four successive pixels.

On the fourth scan line, each arithmetic IC 10 checks how far its calculation point is offset from a start point (F in FIG. 4) of linear interpolation on the X coordinate axis. In this case, a difference between a calculation point of the IC 10D, assigned with the number 3, for calculating the linear interpolation start point F and the start point F is 0. For this reason, the ICs 10A, 10B, 10C and 10D add correction values $-3\Delta$, $-2\Delta$, $-\Delta$ and 0 in a column where the value of the two lower bits of the X coordinate is 3 in FIG. 7 to an intensity value and a Z coordinate value at the painting start point E, respectively. In the next processing cycle 2, the ICs 10A, 10B, 10C and 10D parallelly add $4\Delta I$ and $4\Delta Z$ to the intensity values and the Z coordinate values of the pixels calculated in the processing cycle 1, thereby calculating intensity values I and Z coordinate values of four successive pixels. In this manner, the intensity values I and the Z coordinate values of pixels on each scan line of the triangle polygon as shown FIG. 4 are calculated.

Some of the pixels whose intensity values I and Z coordinate values are calculated as described above are present in the polygon to be painted, while the other pixels are present outside the polygon. In this case, Z coordinate values and intensity values I of the pixels present outside the polygon need not be stored in the Z memories 11 and the I memories 12. Storage of the Z coordinate values and the intensity values I is performed upon supply of write pulses from the ICs 10 to the Z memories 11 and the I memories 12. In this case, each IC 10 checks whether its calculation point is present in the polygon and outputs the write pulse only when the point is present in the polygon. This check is performed by each IC as follows.

Figure 8:
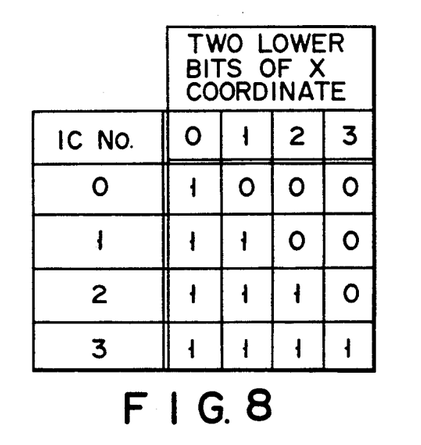
FIGS. 8 to 9 are views for explaining the apparatus of the embodiment.

For example, if a processing cycle is a start cycle (i.e., the processing cycle 1 of any of the first to fourth scan lines in FIG. 4), it is compared two lower bits at an address of an X coordinate of start point of linear interpolation with the number assigned to each arithmetic IC. On the basis of this result, each IC outputs a write pulse in accordance with a rule shown in FIG. 8. When the first scan line is to be processed, a value of two lower bits of the start point of linear interpolation is 0. At this time, a column where the value of the two lower bits at the X coordinate is 0 in FIG. 8 is referred to. In this case, values of all the ICs are 1, and therefore all the ICs 10 output write pulses. On the second scan line, a value of two lower bits of the start point of linear interpolation is 1. At this time, a column where the value of the two lower bits at the X coordinate is 1 in FIG. 8 is referred to. In this case, the value of the IC having the number 0 is 0, and those of the other ICs are 1s. Therefore, the ICs 10B, 10C and 10D except for the IC 10A output write pulses. On the third scan line, a value of two lower bits of the start point of linear interpolation is 2. At this time, a column where the value of the two lower bits at the X coordinate is 2 in FIG. 8 is referred to. In this case, the ICs 10C and 10D corresponding to the numbers 2 and 3 output write pulses. On the fourth scan line, a value of two lower bits of the start point of linear interpolation is 3. At this time, a column where the value of the two lower bits at the X coordinate is 3 in FIG. 8 is referred to. In this case, only the IC 10D corresponding to the number 3 outputs a write pulse.

Meanwhile, if a processing cycle is an end cycle (i.e., the processing cycle 2 of any of the first to fourth scan lines in FIG. 4), it is compared two lower bits at an address of an X coordinate of end point of linear interpolation with the number assigned to each arithmetic IC. On the basis of this result, each IC 10 outputs a write pulse in accordance with a rule shown in FIG. 9. When the first scan line is to be processed, a value of two lower bits of an end point of linear interpolation is 1. At this time, a column where the value of the two lower bits at the X coordinate is 1 in FIG. 9 having the numbers 0 and 1 are 1s and those of the other ICs are 0s, the ICs 10A and 10B corresponding to the numbers 0 and 1 output write pulses. Thereafter, to the fifth scan line, the ICs 10A and 10B corresponding to the numbers 0 and 1 output write pulses in the same manner as described above.

Figure 9:
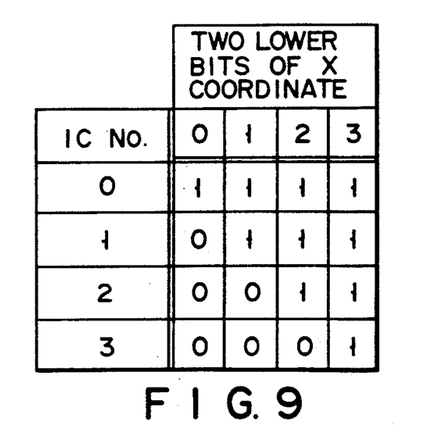

If start and end cycles are simultaneously present as in the processing cycle 2 of the fifth or sixth scan line in FIG. 4, write pulses are output on the basis of values of logical AND products of the values of the rules shown in FIGS. 8 and 9. That is, when the fifth scan line is to be processed, a value of two lower bits of the start point of linear interpolation is 0. At this time, a column where the value of the two lower bits at the X coordinate is 0 in FIG. 8 is referred to. In this case, values corresponding to all the ICs are 1s. A value of two lower bits of an end point of linear interpolation is then 1. At this time, a column where the value of the two lower bits at the X coordinate is 1 in FIG. 9 is referred to. In this case, values corresponding to the ICs having the numbers 0 and 1 are 1s. As a result of calculating logical AND products of the values of the rules shown in FIGS. 8 and 9, therefore, values of the ICs having the numbers 0 and 1 become 1s, and the arithmetic ICs 10A and 10B output write pulses accordingly. When the sixth scan line is to be processed, a value of two lower bits of the start point of linear interpolation is 1. At this time, a column where the value of the two lower bits at the X coordinate is 1 in FIG. 8 is referred to. In this case, values corresponding to the ICs having the numbers 1, 2 and 3 are 1s. In this case, a value of two lower bits of the end point of linear interpolation is 1. At this time, a column where the value of the two lower bits at the X coordinate is 1 in FIG. 9 is referred to. In this case, values corresponding to the ICs having the numbers 0 and 1 are 1s. As a result of calculating logical AND products of the values of the rules shown in FIGS. 8 and 9, therefore, a logical value corresponding to the IC having the number 1 becomes 1, and only the IC 10B outputs a write pulse accordingly.

Figure 10:
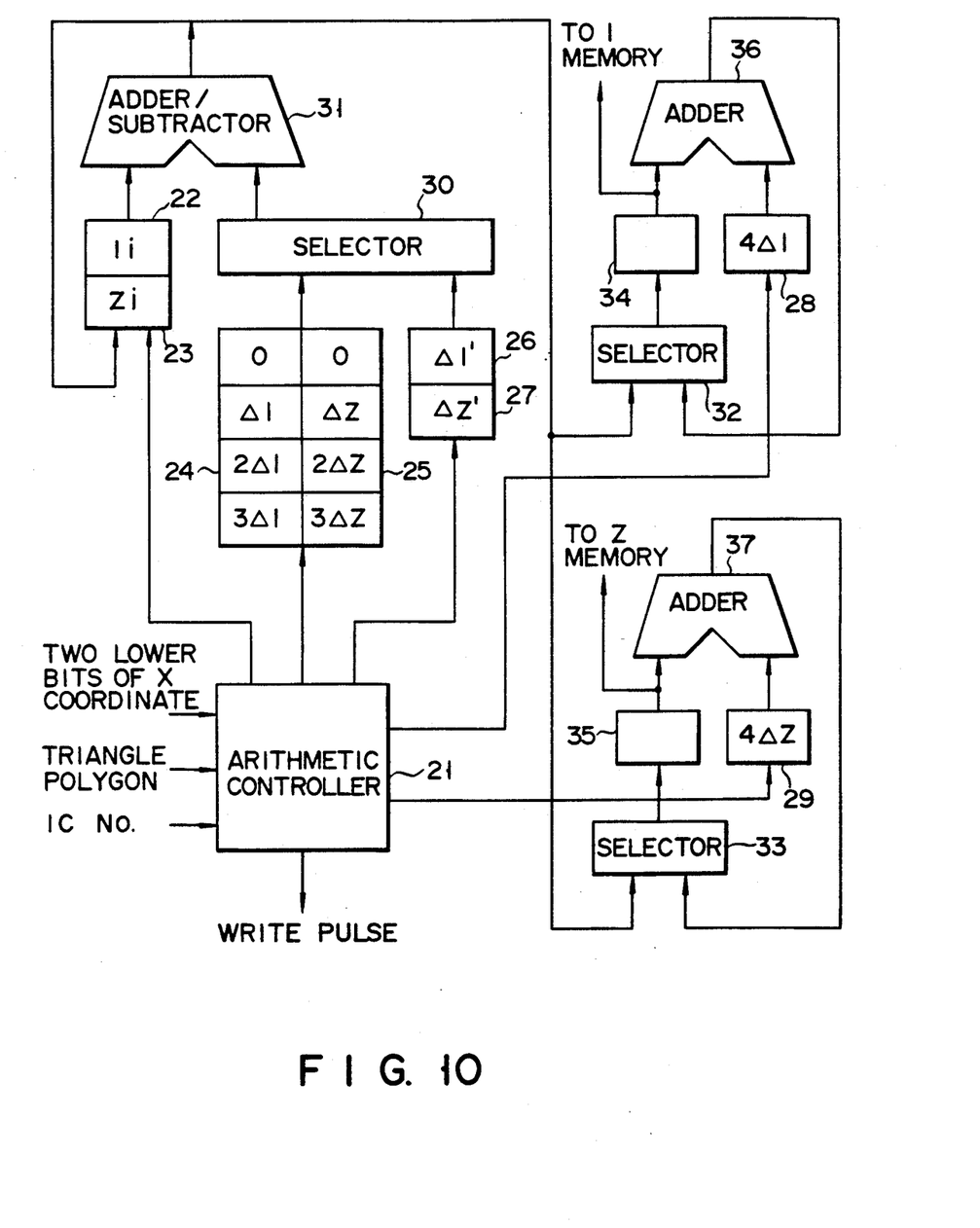
FIG. 10 is a block diagram showing an arrangement of a main part of the apparatus of the embodiment.

FIG. 10 is a block diagram showing an arrangement of a main part of each arithmetic IC used in the apparatus of the above embodiment. Referring to FIG. 10, reference numeral 21 denotes an arithmetic controller. The controller 21 receives information concerning one of the numbers 0, 1, 2 and 3 of the corresponding IC, the two lower bits at an address of the X coordinate, and a vertex of the triangle polygon. On the basis of these inputs, the controller 21 calculates correction values 0, $\Delta I$, $2\Delta I$ and $3\Delta I$ of the intensity as shown in FIG. 5, correction values 0, $\Delta Z$, $2\Delta Z$ and $3\Delta Z$ of the Z coordinate as shown in FIG. 6, an inclination $\Delta I'$ of the intensity value I and an inclination $\Delta Z'$ of the Z coordinate of the left side of the triangle polygon, an initial value Ii of the intensity and an initial value Zi of the Z coordinate of the arithmetic start point on each scan line, and values of the $4\Delta I$ and $4\Delta Z$, and outputs the write pulse.

If an input triangle polygon has a side BC parallel to the X coordinate axis as shown in FIG. 3, the controller 21 calculates the $\Delta I$ and $\Delta Z$ on the basis of the following equations, respectively:

$$\Delta I = \frac{Ia - Ib}{xa - xb} \qquad 5$$

$$\Delta Z = \frac{za - zb}{xa - xb} \qquad 6$$

If an input triangle polygon has a side BC parallel to the X coordinate axis as shown in FIG. 3, the controller 21 also calculates the $\Delta I'$ and $\Delta Z'$ on the basis of the following equations, respectively:

$$\Delta I' = \frac{Ia - Ib}{ya - yb} \qquad 7$$

$$\Delta Z' = \frac{za - zb}{ya - yb} \qquad 8$$

The initial values Ii and Zi of the intensity and the Z coordinate calculated by the controller 21 are supplied to and temporarily stored in registers 22 and 23, respectively. The correction values 0, $\Delta I$, $2\Delta I$ and of the intensity calculated by the controller 21 are supplied to and temporarily stored in a register 24. The correction values 0, $\Delta Z$, $2\Delta Z$ and $3\Delta Z$ of the Z coordinate calculated by the controller 21 are supplied to and temporarily stored in a register 25. The inclinations $\Delta I'$ and $\Delta Z'$ of the intensity value I and the Z coordinate of the left side of the triangle polygon calculated by the controller 21 are supplied to and temporarily stored in registers 26 and 27, respectively. The values of $4\Delta I$ and $4\Delta Z$ calculated by the controller 21 are supplied to and temporarily stored in registers 28 and 29, respectively. In addition, the controller 21 performs read control of the values stored in the registers 22 to 29.

Referring to FIG. 10, reference numeral 30 denotes a selector; 31, an adder/subtractor; 32 and 33, selectors; 34 and 35, registers for storing outputs from the selectors 32 and 33, respectively; and 36 and 37, adders. Operations of the selector 30, the adder/subtractor 31, the selectors 32 and 33, the registers 34 and 35, and the adders 36 and 37 are also controlled by the controller 21.

Figure 11:
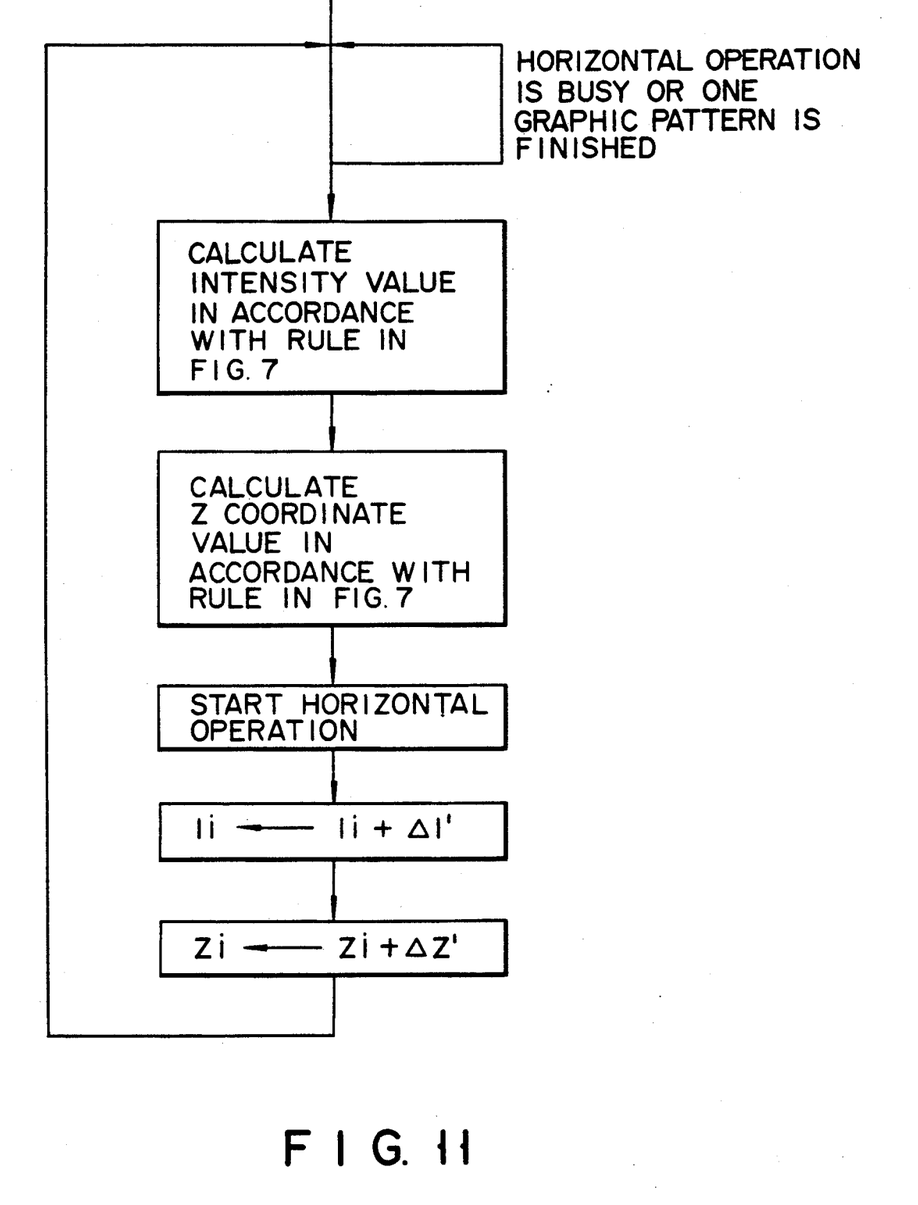
FIGS. 11 and 12 are flow charts for explaining an operation of the circuit shown in FIG. 10.
Figure 12:
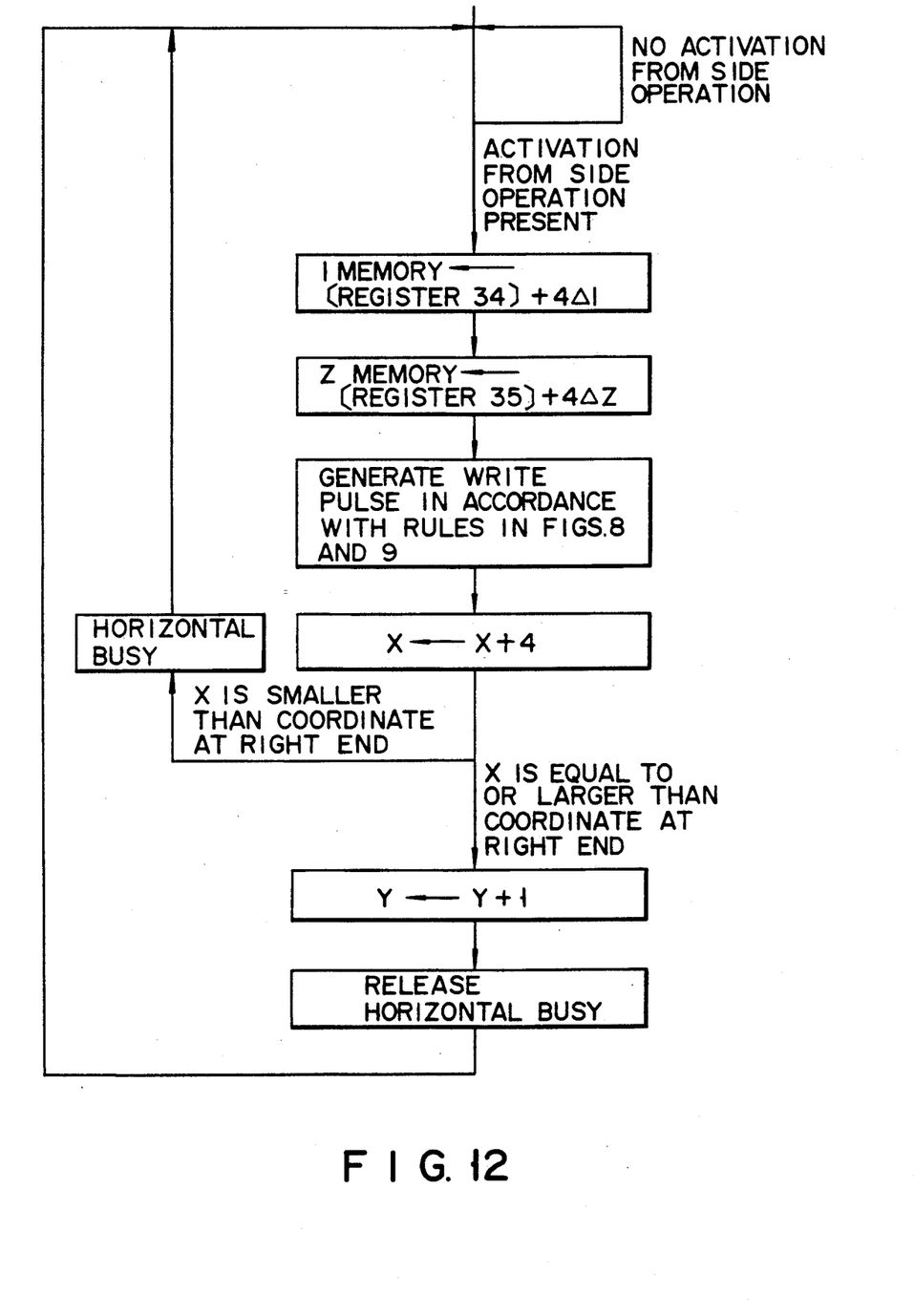

An operation of the circuit having the above arrangement will be described below with reference to flow charts shown in FIGS. 11 and 12. Note that an operation of a circuit consisting of the registers 22, 23, 24, 25, 26 and 27, the selector 30 and the adder/subtractor 31 will be called a side operation, and that of a circuit consisting of the registers 28, 29, 34 and 35, the selectors 32 and 33 and the adders 36 and 37 will be called a horizontal operation, for the convenience of description. First, the initial value Ii of the intensity at the vertex B of the polygon stored in the register 22 is supplied to the adder/subtractor 31. On the basis of input, the controller 21 designates a correction value of the intensity stored in the register 24. The correction value in the register 24 designated by the controller 21 is supplied to the adder/subtractor 31 via the selector 30. The adder/subtractor 31 performs addition or subtraction between the input initial value Ii of the intensity and the correction value read out from the register 24, thereby calculating a intensity value at a start point of a calculation according to the rule shown in FIG. 7. The calculated intensity value is stored in the register 34 via the selector 32. The initial value Zi of the Z coordinate at the vertex B of the polygon stored in the register 23 is then supplied to the adder/subtractor 31. On the basis of input, the controller 21 designates a correction value of the Z coordinate stored in the register 25. The correction value in the register 25 designated by the controller 21 is supplied to the adder/subtractor 31 via the selector 30. The adder/subtractor 31 performs addition or subtraction between the initial value Zi of the Z coordinate and the correction value read out from the register 25, thereby calculating a Z coordinate value at the calculation start point according to the rule shown in FIG. 7. The calculated Z coordinate value is stored in the register 35 via the selector 33. Thereafter, the horizontal operation is started. The horizontal operation will be performed as shown in FIG. 12. First, upon activation from the side operation, the adder 36 adds the value of $4\Delta I$ stored in the register 28 to the initial value of the intensity stored in the register 34, and the addition result is supplied to the I memory.

Similarly, the adder 37 adds the value of $4\Delta Z$ stored in the register 29 to the initial value of the Z coordinate of the linear interpolation calculation stored in the register 35, and the addition result is supplied to the Z memory. Thereafter, in accordance with the rule shown in FIGS. 8 or 9 or a logical AND product of the values of both the rules, the controller 21 generates a write pulse. Thereafter, an address of the X coordinate is incremented by four. At this time, if the address of the X coordinate is smaller than a coordinate at the right end of the scan line, the horizontal operation is determined to be Busy, and the flow returns to the start of the operation. Meanwhile, if the address of the X coordinate incremented by four is either equal to or larger than the coordinate at the right end of the scan line, it is determined that calculations of pixels on the scan line are completed. Therefore, an address of the Y coordinate is incremented by one to advance to the next upper scan line, and the Busy state of the horizontal operation is released. In this manner, intensity values and Z coordinate values of pixels on the first scan line are calculated.

Intensity values and Z coordinate values of pixels on second and subsequent scan lines are calculated as follows. First, the intensity value Ii stored in the register 22 and the inclination $\Delta I'$ of the intensity value stored in the register 26 are supplied to the adder/subtractor 31. The adder/subtractor 31 adds the values from the registers 22 and 26 to calculate a intensity value at a start point of a calculation on the next scan line. The calculated intensity value is stored in the register 22 again. After correction at the start point is performed using the value shown in FIG. 7, this corrected intensity value is supplied to the register 34 via the selector 32. Similarly, the Z coordinate value Zi stored in the register 23 and the inclination $\Delta Z'$ of the Z coordinate value stored in the register 27 are supplied to the adder/subtractor 31. The adder/subtractor 31 adds the values from the registers 23 and 27 to calculate a Z coordinate value at the calculation start point on the next scan line. The calculated Z coordinate value is stored in the register 23 again. After correction at the start point is performed using the value shown in FIG. 7, this corrected Z coordinate value is supplied to the register 35 via the selector 33.

Thereafter, the adder 36 sequentially adds the value of $4\Delta I$ to the intensity value stored in the register 34 in each processing cycle. Similarly, the adder 37 sequentially adds the value of $4\Delta Z$ to the Z coordinate value stored in the register 35 in each processing cycle.

As described above, according the embodiment of the present invention, painting of a polygon for performing shading is parallelly executed using four arithmetic ICs, and a calculation result of each IC is stored in Z and I memories exclusive to the IC. Therefore, the processing speed is much higher than that of a conventional apparatus in which these calculations are performed using a single IC. For example, in order to paint a polygon consisting of 21 points as shown in FIG. 4, 21 processing cycles are required in a conventional apparatus, while only 10 cycles are necessary in the apparatus of the above embodiment. Since a graphic pattern to be subjected to shading generally consists of a very large number of polygons and a polygon consists of a very large number of pixels, a processing time can be largely shortened as a whole.

Figure 13:
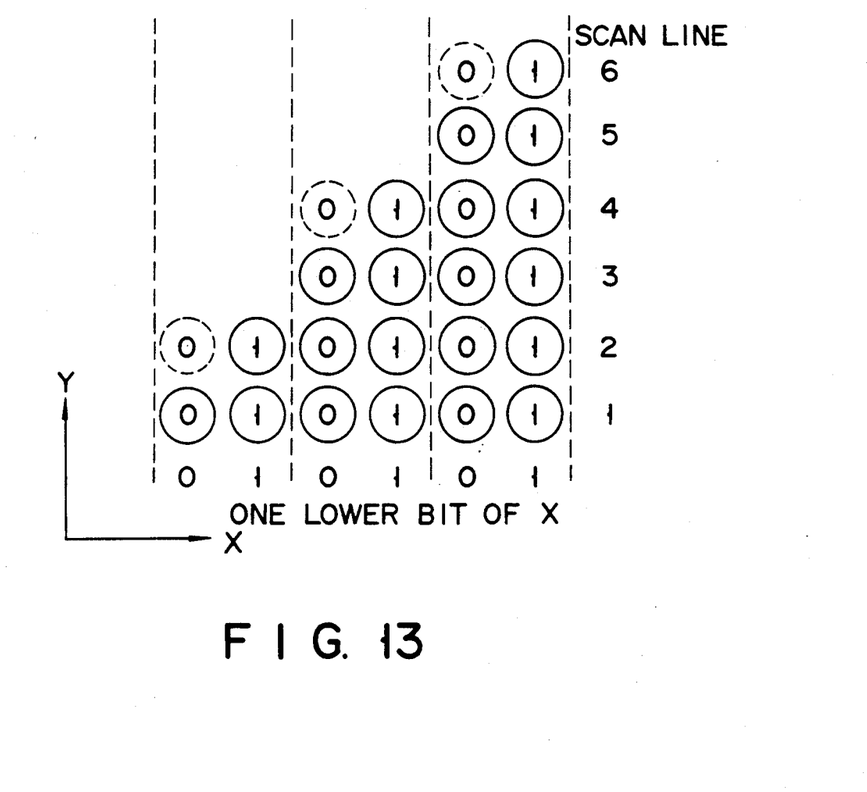
FIGS. 13 and 14 are views for explaining another embodiment of the present invention.
Figure 14:
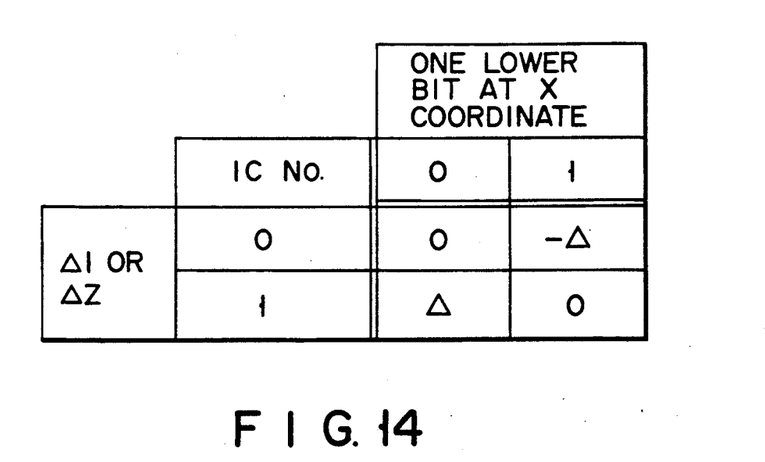

The present invention is not limited to the above embodiment but can be variously modified. For example, in the above embodiment, four arithmetic ICs are used to parallelly calculate intensity values and Z coordinate values of pixels. Since the object of the present invention, however, can be achieved by two or more arithmetic ICs, the number of the arithmetic ICs may be any number more than one. For example, referring to FIG. 13, a triangle polygon consisting of 21 pixels as in FIG. 4 is parallelly processed using two arithmetic ICs. In this case, although 12 processing cycles are required, this number of the processing cycles is much smaller than conventional 21 cycles. FIG. 14 shows values corresponding to those in FIG. 7 obtained using two arithmetic ICs. In this case, since a difference between a start point of a linear interpolation and a calculation execution point of each arithmetic IC on the X coordinate axis is either 0 or 1, a correction value is any of 0, $\Delta$ or $-\Delta$.

As has been described above, according to the present invention, painting of each polygon is performed using two or more arithmetic ICs. Therefore, a three-dimensional graphic processing apparatus capable of executing painting of a three-dimensional graphic pattern at high speed can be provided.

What is claimed is:

1. A three-dimensional graphic processing apparatus for shading a three-dimensional graphic pattern having a plurality of triangle polygons, wherein each triangle polygon includes a plurality of scan lines, and each scan line includes one or more pixels thereon, said apparatus comprising:

a plurality of pixel shading circuits, each pixel shading circuit corresponding to a respective one of said one or more pixels and for calculating intensity and depth coordinate values of the respective pixel independent of and simultaneous to the calculation of the intensity and depth coordinate values by the other pixel shading circuits, each of said plurality of pixel shading circuits including:

a memory for storing the intensity and depth coordinate values of the respective pixel;

reference selection means for selecting one of said one or more pixels as a reference pixel;

reference value means coupled to the reference selection means for determining the intensity and depth coordinate values of said reference pixel;

intensity correction means, coupled to the reference values means, for adding a correction intensity value inclination to the intensity value of said reference pixel for the respective one of said one or more pixels, the correction intensity value inclination being dependent on the position of the respective pixel on the scan line relative to the position of the reference pixel; and depth correction means, coupled to the reference value means, for adding a correction depth coordinate value inclination to the depth coordinate value of said reference pixel for the respective one of said one or more pixels, the depth coordinate value inclination being dependent on the position of the respective pixel on the scan line relative to the position of the reference pixel.

2. The three-dimensional graphic processing apparatus of claim 1, wherein the reference value circuit means includes inclination of an associated triangle polygon, an intensity value inclination and a depth coordinate value inclination associated with one side of the associated triangle polygon, and an initial intensity value and an initial depth coordinate value of a reference one of one or more pixels on a scan line of the associated triangle polygon.

3. The three-dimensional graphic processing apparatus in claim 2, wherein the inclination value means includes means for calculating a plurality of correction intensity value inclinations and correction depth coordinate value inclinations of the associated triangle polygon.

4. The three-dimensional graphic processing apparatus of claim 1, wherein the reference value circuit means includes:

means for calculating a difference between the coordinates of said reference pixel and another of said one or more pixels in reference to a coordinate axis; and means for multiplying said difference with said correction intensity and depth coordinate value inclinations to determine the intensity and depth coordinate values of said other pixel.

5. The three-dimensional graphic processing apparatus of claim 1, wherein the reference value circuit means includes:

means for detecting whether the triangle polygon includes said reference pixel; and means coupled to a respective memory for controlling the storing of the intensity and depth coordinate values in accordance with a detection result.

6. A three-dimensional graphic processing apparatus for shading a three-dimensional graphic pattern having a plurality of triangle polygons, wherein each triangle polygon includes a plurality of scan lines, and each scan line includes one or more pixels thereon, said apparatus comprising:

a plurality of pixel shading circuits, each pixel shading circuit corresponding to a respective one of said one or more pixels and for calculating the intensity and depth coordinate values of the respective pixel independent of and simultaneous to the calculation of the intensity and depth coordinate values by the other circuits, each of said plurality of pixel shading circuits including:

a memory for storing the intensity and depth coordinate values of the respective pixel;

inclination value means for determining an intensity value inclination and an depth coordinate value inclination of an associated triangle polygon, an intensity value inclination and a depth coordinate value inclination associated with one side of the associated triangle polygon, an initial intensity value and an initial depth coordinate value of one of said one or more pixels, and a plurality of correction intensity value inclinations and correction depth coordinate value inclinations;

first register means, coupled to said inclination value means, for storing said intensity value inclination of the associated triangle polygon;

second register means, coupled to said inclination value means, for storing said depth coordinate value inclination of the associated triangle polygon;

third register means, coupled to the inclination value means, for storing said intensity value inclination associated with one side of the associated triangle polygon;

fourth register means, coupled to the inclination value means, for storing said depth coordinate value inclination associated with one side of the associated triangle polygon;

means, coupled to the inclination value means, for selecting one of said plurality of correction intensity value inclinations and one of said plurality of correction depth coordinate value inclinations;

fifth register means, coupled to said selecting means, for storing a selected correction intensity value inclination;

sixth register means, coupled to said selecting means, for storing a selected correction depth coordinate value inclination;

seventh register means, coupled to the inclination value means, for storing said plurality of correction intensity value inclinations except the selected correction intensity value inclination;

eighth register means, coupled to the inclination value means, for storing said plurality of correction depth coordinated value inclinations except the selected correction depth coordinate value inclination;

value inclination selector means, coupled to said third, fourth, seventh and eighth register means, for selectively reading out either stored intensity value inclinations or stored depth coordinate value inclinations;

adder/subtractor means, coupled to said value inclination selector means, for adding and subtracting between read out intensity value inclinations or between read out depth coordinate value inclinations;

first adder means, coupled to said adder/subtractor means and fifth register means, for adding added or subtracted intensity value inclinations to the selected correction intensity value inclination to calculate the intensity value of said corresponding pixel; and second adder means, coupled to said adder/subtractor means and sixth register means, for adding added or subtracted depth coordinate value inclinations to the selected correction depth coordinate value inclination to calculate the depth coordinate value of said corresponding pixel.

7. The three-dimensional graphic processing apparatus of claim 6, further comprises:

first selector means, coupled to the adder/subtractor means, for providing added or subtracted intensity value inclinations to said first adder means, the input of said first selector means coupled to the output of the first adder means; and second selector means, coupled to the adder/subtractor means, for providing added or subtracted depth coordinate value inclination to said second adder means, the input of said second selector means coupled to the output of the second adder means.

* * * * *

UNITED STATES PATENT AND TRADEMARK OFFICE
CERTIFICATE OF CORRECTION

PATENT NO. : 5,163,127
DATED : November 10, 1992
INVENTOR(S) : Nobuyuki Ikumi et al.

It is certified that error appears in the above-identified patent and that said Letters Patent is hereby corrected as shown below:

Column 10, claim 2, line 34, after "inclination" insert --reference value means for determining an intensity value inclination and a depth coordinate value inclination--

Signed and Sealed this

Eighteenth Day of January, 1994

*Attest:*

BRUCE LEHMAN

*Attesting Officer*    *Commissioner of Patents and Trademarks*